(12) United States Patent
Horowitz et al.

(10) Patent No.: US 11,394,532 B2
(45) Date of Patent: Jul. 19, 2022

(54) SYSTEMS AND METHODS FOR HIERARCHICAL KEY MANAGEMENT IN ENCRYPTED DISTRIBUTED DATABASES

(71) Applicant: MongoDB, Inc., New York, NY (US)

(72) Inventors: Eliot Horowitz, New York, NY (US); Per Andreas Nilsson, Brooklyn, NY (US)

(73) Assignee: MongoDB, Inc., New York, NY (US)

( * ) Notice: Subject to any disclaimer, the term of this patent is extended or adjusted under 35 U.S.C. 154(b) by 230 days.

(21) Appl. No.: 16/887,092

(22) Filed: May 29, 2020

(65) Prior Publication Data
US 2020/0295925 A1    Sep. 17, 2020

Related U.S. Application Data

(60) Division of application No. 15/605,512, filed on May 25, 2017, now Pat. No. 10,673,623, which is a continuation-in-part of application No. 15/604,856, filed on May 25, 2017, now Pat. No. 10,846,411, which is a continuation-in-part of application No. 14/992,225, filed on Jan. 11, 2016, now Pat. No. 10,262,050.

(60) Provisional application No. 62/343,440, filed on May 31, 2016, provisional application No. 62/341,453, filed on May 25, 2016, provisional application No. 62/232,979, filed on Sep. 25, 2015.

(51) Int. Cl.
*H04L 9/08* (2006.01)
*G06F 21/60* (2013.01)
*G06F 21/62* (2013.01)

(52) U.S. Cl.
CPC .......... *H04L 9/0822* (2013.01); *G06F 21/602* (2013.01); *G06F 21/6218* (2013.01)

(58) Field of Classification Search
CPC ... H04L 9/0822; G06F 21/602; G06F 21/6218
See application file for complete search history.

(56) References Cited

U.S. PATENT DOCUMENTS

| | | | |
|---|---|---|---|
| 4,918,593 | A | 4/1990 | Huber |
| 5,379,419 | A | 1/1995 | Heffernan et al. |
| 5,416,917 | A | 5/1995 | Adair et al. |
| 5,471,629 | A | 11/1995 | Risch |

(Continued)

OTHER PUBLICATIONS

U.S. Appl. No. 15/706,593, filed Sep. 15, 2017, Merriman et al.
(Continued)

*Primary Examiner* — Samson B Lemma
(74) *Attorney, Agent, or Firm* — Wolf, Greenfield & Sacks, P.C.

(57) ABSTRACT

According to one aspect, methods and systems are provided for modifying an encryption scheme in a database system. The methods and systems can include at least one internal database key; at least one database configured to be encrypted and decrypted using the at least one internal database key; a memory configured to store a master key; a key management server interface configured to communicate with a key management server; and a database application configured to receive, into the memory, the master key from the key management server via the key management server interface, and encrypt and decrypt the at least one internal database key using the master key.

20 Claims, 8 Drawing Sheets

(56) References Cited

U.S. PATENT DOCUMENTS

| | | | |
|---|---|---|---|
| 5,551,027 A | 8/1996 | Choy et al. | |
| 5,598,559 A | 1/1997 | Chaudhuri | |
| 5,710,915 A | 1/1998 | McElhiney | |
| 5,884,299 A | 3/1999 | Ramesh et al. | |
| 5,999,179 A | 12/1999 | Kekic et al. | |
| 6,065,017 A | 5/2000 | Barker | |
| 6,088,524 A | 7/2000 | Levy et al. | |
| 6,112,201 A | 8/2000 | Wical | |
| 6,115,705 A | 9/2000 | Larson | |
| 6,212,529 B1 | 4/2001 | Boothby et al. | |
| 6,240,406 B1 | 5/2001 | Tannen | |
| 6,240,514 B1* | 5/2001 | Inoue | H04W 12/033 713/153 |
| 6,249,866 B1* | 6/2001 | Brundrett | G06F 12/1408 713/165 |
| 6,324,540 B1 | 11/2001 | Khanna et al. | |
| 6,324,654 B1 | 11/2001 | Wahl et al. | |
| 6,339,770 B1 | 1/2002 | Leung et al. | |
| 6,351,742 B1 | 2/2002 | Agarwal et al. | |
| 6,363,389 B1 | 3/2002 | Lyle et al. | |
| 6,385,201 B1 | 5/2002 | Iwata | |
| 6,385,604 B1 | 5/2002 | Bakalash et al. | |
| 6,427,230 B1 | 7/2002 | Goiffon et al. | |
| 6,438,538 B1 | 8/2002 | Goldring | |
| 6,496,843 B1 | 12/2002 | Getchius et al. | |
| 6,505,187 B1 | 1/2003 | Shatdal | |
| 6,611,850 B1 | 8/2003 | Shen | |
| 6,687,846 B1 | 2/2004 | Adrangi et al. | |
| 6,691,101 B2 | 2/2004 | MacNicol et al. | |
| 6,748,393 B1 | 6/2004 | Kapoor et al. | |
| 6,801,905 B2 | 10/2004 | Andrei | |
| 6,823,474 B2 | 11/2004 | Kampe et al. | |
| 6,920,460 B1 | 7/2005 | Srinivasan et al. | |
| 6,959,369 B1 | 10/2005 | Ashton et al. | |
| 6,973,452 B2 | 12/2005 | Metzger et al. | |
| 7,020,649 B2 | 3/2006 | Cochrane et al. | |
| 7,032,089 B1 | 4/2006 | Ranade et al. | |
| 7,082,473 B2 | 7/2006 | Breitbart et al. | |
| 7,177,866 B2 | 2/2007 | Holenstein et al. | |
| 7,181,460 B2 | 2/2007 | Coss et al. | |
| 7,191,299 B1 | 3/2007 | Kekre et al. | |
| 7,246,345 B1 | 7/2007 | Sharma et al. | |
| 7,447,807 B1 | 11/2008 | Merry et al. | |
| 7,467,103 B1 | 12/2008 | Murray et al. | |
| 7,469,253 B2 | 12/2008 | Celis et al. | |
| 7,472,117 B2 | 12/2008 | Dettinger et al. | |
| 7,486,661 B2 | 2/2009 | Van den Boeck et al. | |
| 7,529,834 B1 | 5/2009 | Birrell et al. | |
| 7,548,928 B1 | 6/2009 | Dean et al. | |
| 7,552,356 B1 | 6/2009 | Waterhouse et al. | |
| 7,558,481 B2 | 7/2009 | Jenkins et al. | |
| 7,567,991 B2 | 7/2009 | Armangau et al. | |
| 7,617,369 B1 | 11/2009 | Bezbaruah et al. | |
| 7,634,459 B1 | 12/2009 | Eshet et al. | |
| 7,647,329 B1 | 1/2010 | Fischman et al. | |
| 7,657,570 B2 | 2/2010 | Wang et al. | |
| 7,657,578 B1 | 2/2010 | Karr et al. | |
| 7,668,801 B1 | 2/2010 | Koudas et al. | |
| 7,761,465 B1* | 7/2010 | Nonaka | H04L 9/083 713/161 |
| 7,827,144 B1 | 11/2010 | Saito et al. | |
| 7,957,284 B2 | 6/2011 | Lu et al. | |
| 7,962,458 B2 | 6/2011 | Holenstein et al. | |
| 8,005,804 B2 | 8/2011 | Greer | |
| 8,005,868 B2 | 8/2011 | Saborit et al. | |
| 8,037,059 B2 | 10/2011 | Bestgen et al. | |
| 8,078,825 B2 | 12/2011 | Oreland et al. | |
| 8,082,265 B2 | 12/2011 | Carlson et al. | |
| 8,086,597 B2 | 12/2011 | Balmin et al. | |
| 8,099,572 B1 | 1/2012 | Arora et al. | |
| 8,103,906 B1 | 1/2012 | Alibakhsh et al. | |
| 8,108,443 B2 | 1/2012 | Thusoo | |
| 8,126,848 B2 | 2/2012 | Wagner | |
| 8,170,984 B2 | 5/2012 | Bakalash et al. | |
| 8,185,505 B1 | 5/2012 | Blitzer et al. | |
| 8,260,840 B1 | 9/2012 | Sirota et al. | |
| 8,296,419 B1 | 10/2012 | Khanna et al. | |
| 8,305,999 B2 | 11/2012 | Palanki et al. | |
| 8,321,558 B1 | 11/2012 | Sirota et al. | |
| 8,352,450 B1 | 1/2013 | Mraz et al. | |
| 8,352,463 B2 | 1/2013 | Nayak | |
| 8,363,961 B1 | 1/2013 | Avidan et al. | |
| 8,370,857 B2 | 2/2013 | Kamii et al. | |
| 8,386,463 B2 | 2/2013 | Bestgen et al. | |
| 8,392,482 B1 | 3/2013 | McAlister et al. | |
| 8,539,197 B1 | 9/2013 | Marshall et al. | |
| 8,572,031 B2* | 10/2013 | Merriman | G06F 11/0709 707/613 |
| 8,589,382 B2 | 11/2013 | Betawadkar-Norwood | |
| 8,589,574 B1 | 11/2013 | Cormie et al. | |
| 8,615,507 B2 | 12/2013 | Varadarajulu et al. | |
| 8,712,044 B2* | 4/2014 | MacMillan | H04L 9/3239 380/278 |
| 8,712,993 B1 | 4/2014 | Ordonez | |
| 8,751,533 B1 | 6/2014 | Dhavale et al. | |
| 8,775,070 B1 | 7/2014 | Bhatia | |
| 8,843,441 B1 | 9/2014 | Rath et al. | |
| 8,869,256 B2 | 10/2014 | Sample | |
| 8,996,463 B2 | 3/2015 | Merriman et al. | |
| 9,015,431 B2 | 4/2015 | Resch et al. | |
| 9,069,827 B1 | 6/2015 | Rath et al. | |
| 9,116,862 B1 | 8/2015 | Rath et al. | |
| 9,141,814 B1* | 9/2015 | Murray | G06F 11/2041 |
| 9,183,254 B1 | 11/2015 | Cole et al. | |
| 9,262,462 B2 | 2/2016 | Merriman et al. | |
| 9,268,639 B2 | 2/2016 | Leggette et al. | |
| 9,274,902 B1 | 3/2016 | Morley et al. | |
| 9,313,604 B1 | 4/2016 | Holcombe | |
| 9,317,576 B2 | 4/2016 | Merriman et al. | |
| 9,350,633 B2 | 5/2016 | Cudak et al. | |
| 9,350,681 B1 | 5/2016 | Kitagawa et al. | |
| 9,442,995 B2 | 9/2016 | Pareek et al. | |
| 9,460,008 B1 | 10/2016 | Leshinsky et al. | |
| 9,495,427 B2 | 11/2016 | Abadi et al. | |
| 9,569,481 B1 | 2/2017 | Chandra et al. | |
| 9,628,404 B1 | 4/2017 | Goffinet et al. | |
| 9,660,666 B1 | 5/2017 | Ciarlini et al. | |
| 9,715,433 B2 | 7/2017 | Mu et al. | |
| 9,740,762 B2 | 8/2017 | Horowitz et al. | |
| 9,792,322 B2 | 10/2017 | Merriman et al. | |
| 9,800,685 B2 | 10/2017 | Neerincx et al. | |
| 9,805,108 B2 | 10/2017 | Merriman et al. | |
| 9,881,034 B2 | 1/2018 | Horowitz et al. | |
| 9,959,308 B1 | 5/2018 | Carman et al. | |
| 10,031,931 B2 | 7/2018 | Horowitz et al. | |
| 10,031,956 B2 | 7/2018 | Merriman et al. | |
| 10,262,050 B2 | 4/2019 | Bostic et al. | |
| 10,303,570 B2 | 5/2019 | Nakajima | |
| 10,346,430 B2 | 7/2019 | Horowitz et al. | |
| 10,346,434 B1 | 7/2019 | Morkel et al. | |
| 10,366,100 B2 | 7/2019 | Horowitz et al. | |
| 10,372,926 B1* | 8/2019 | Leshinsky | H04L 9/0894 |
| 10,394,822 B2 | 8/2019 | Stearn | |
| 10,423,626 B2 | 9/2019 | Stearn et al. | |
| 10,430,433 B2 | 10/2019 | Stearn et al. | |
| 10,467,245 B2 | 11/2019 | Sirer et al. | |
| 10,474,645 B2 | 11/2019 | Freedman et al. | |
| 10,489,357 B2 | 11/2019 | Horowitz et al. | |
| 10,496,669 B2 | 12/2019 | Merriman et al. | |
| 10,614,098 B2 | 4/2020 | Horowitz et al. | |
| 10,621,050 B2 | 4/2020 | Horowitz et al. | |
| 10,621,200 B2 | 4/2020 | Merriman et al. | |
| 10,671,496 B2 | 6/2020 | Horowitz et al. | |
| 10,673,623 B2 | 6/2020 | Horowitz et al. | |
| 10,698,775 B2 | 6/2020 | Horowitz et al. | |
| 10,713,275 B2 | 7/2020 | Merriman et al. | |
| 10,713,280 B2 | 7/2020 | Horowitz et al. | |
| 10,740,353 B2 | 8/2020 | Horowitz et al. | |
| 10,740,355 B2 | 8/2020 | Horowitz et al. | |
| 10,776,220 B2 | 9/2020 | Horowitz et al. | |
| 10,846,305 B2 | 11/2020 | Merriman et al. | |
| 10,846,411 B2 | 11/2020 | Horowitz et al. | |
| 10,866,868 B2 | 12/2020 | Horowitz | |
| 10,872,095 B2 | 12/2020 | Horowitz et al. | |

(56) References Cited

U.S. PATENT DOCUMENTS

| | | |
|---|---|---|
| 10,977,277 B2 | 4/2021 | Merriman et al. |
| 10,990,590 B2 | 4/2021 | Merriman et al. |
| 10,997,211 B2 | 5/2021 | Merriman et al. |
| 11,012,806 B2 | 5/2021 | Tan et al. |
| 11,222,043 B2 | 1/2022 | Horowitz et al. |
| 2001/0021929 A1 | 9/2001 | Lin et al. |
| 2002/0029207 A1 | 3/2002 | Bakalash et al. |
| 2002/0065675 A1 | 5/2002 | Grainger et al. |
| 2002/0065676 A1 | 5/2002 | Grainger et al. |
| 2002/0065677 A1 | 5/2002 | Grainger et al. |
| 2002/0143901 A1 | 10/2002 | Lupo et al. |
| 2002/0147842 A1 | 10/2002 | Breitbart et al. |
| 2002/0184239 A1 | 12/2002 | Mosher, Jr. et al. |
| 2002/0198872 A1 | 12/2002 | MacNicol et al. |
| 2003/0046307 A1 | 3/2003 | Rivette et al. |
| 2003/0212668 A1 | 4/2003 | Hinshaw et al. |
| 2003/0084073 A1* | 5/2003 | Hotti .............. G06F 16/275 |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0078569 A1* | 4/2004 | Hotti ............... G06F 21/6227 |
| | | 713/165 |
| 2004/0133591 A1 | 7/2004 | Holenstein et al. |
| 2004/0168084 A1 | 8/2004 | Owen et al. |
| 2004/0186817 A1 | 9/2004 | Thames et al. |
| 2004/0186826 A1 | 9/2004 | Choi et al. |
| 2004/0205048 A1 | 10/2004 | Pizzo et al. |
| 2004/0220937 A1 | 11/2004 | Bickford et al. |
| 2004/0236743 A1 | 11/2004 | Blaicher et al. |
| 2004/0254919 A1 | 12/2004 | Giuseppini |
| 2005/0027796 A1 | 2/2005 | San Andres et al. |
| 2005/0033756 A1 | 2/2005 | Kottomtharayil et al. |
| 2005/0038833 A1 | 2/2005 | Colrain et al. |
| 2005/0192921 A1 | 9/2005 | Chaudhuri et al. |
| 2005/0216923 A1 | 9/2005 | Krebs |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1 | 1/2006 | Prompt et al. |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0224603 A1 | 10/2006 | Correll, Jr. |
| 2006/0235905 A1 | 10/2006 | Kapur |
| 2006/0259160 A1 | 11/2006 | Hood et al. |
| 2006/0287998 A1 | 12/2006 | Folting et al. |
| 2006/0288232 A1* | 12/2006 | Ho ..................... H04L 9/0897 |
| | | 713/185 |
| 2006/0294129 A1 | 12/2006 | Stanfill et al. |
| 2007/0050436 A1 | 3/2007 | Chen et al. |
| 2007/0061487 A1 | 3/2007 | Moore et al. |
| 2007/0094237 A1 | 4/2007 | Mitchell et al. |
| 2007/0124317 A1 | 5/2007 | Dettinger et al. |
| 2007/0203944 A1 | 8/2007 | Batra et al. |
| 2007/0226640 A1 | 9/2007 | Holbrook et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0005475 A1 | 1/2008 | Lubbers et al. |
| 2008/0016021 A1 | 1/2008 | Gulbeden et al. |
| 2008/0071755 A1 | 3/2008 | Friedman et al. |
| 2008/0098041 A1 | 4/2008 | Chidambaran et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0254572 A1 | 10/2009 | Redlich et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0057764 A1 | 3/2010 | Williamson |
| 2010/0058010 A1 | 3/2010 | Augenstein et al. |
| 2010/0094851 A1 | 4/2010 | Bent et al. |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0223078 A1 | 9/2010 | Willis et al. |
| 2010/0235606 A1 | 9/2010 | Oreland et al. |
| 2010/0250497 A1 | 9/2010 | Redlich et al. |
| 2010/0250930 A1* | 9/2010 | Csaszar ............ H04L 29/12066 |
| | | 713/168 |
| 2010/0257142 A1 | 10/2010 | Murphy et al. |
| 2010/0333111 A1 | 12/2010 | Kothamasu |
| 2010/0333116 A1 | 12/2010 | Prahlad et al. |
| 2011/0022642 A1 | 1/2011 | deMilo et al. |
| 2011/0032571 A1 | 2/2011 | Kitada |
| 2011/0125704 A1 | 5/2011 | Mordinova et al. |
| 2011/0125766 A1 | 5/2011 | Carozza |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2011/0258225 A1 | 10/2011 | Taylor et al. |
| 2011/0258317 A1 | 10/2011 | Sinha et al. |
| 2011/0295686 A1 | 12/2011 | Martin-Cocher |
| 2011/0307338 A1 | 12/2011 | Carlson |
| 2012/0054155 A1 | 3/2012 | Darcy |
| 2012/0054755 A1 | 3/2012 | Evans |
| 2012/0076058 A1 | 3/2012 | Padmanabh et al. |
| 2012/0078848 A1 | 3/2012 | Jennas et al. |
| 2012/0078896 A1 | 3/2012 | Nixon et al. |
| 2012/0079224 A1 | 3/2012 | Clayton et al. |
| 2012/0084414 A1 | 4/2012 | Brock et al. |
| 2012/0084789 A1 | 4/2012 | Iorio |
| 2012/0109892 A1 | 5/2012 | Novik et al. |
| 2012/0109935 A1 | 5/2012 | Meijer |
| 2012/0130973 A1 | 5/2012 | Tamm et al. |
| 2012/0130988 A1 | 5/2012 | Nica et al. |
| 2012/0131278 A1 | 5/2012 | Chang et al. |
| 2012/0136835 A1 | 5/2012 | Kosuru et al. |
| 2012/0138671 A1 | 6/2012 | Gaede et al. |
| 2012/0158655 A1 | 6/2012 | Dove et al. |
| 2012/0158949 A1 | 6/2012 | Lee |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0179833 A1 | 7/2012 | Kenrick et al. |
| 2012/0198200 A1 | 8/2012 | Li et al. |
| 2012/0215740 A1 | 8/2012 | Vaillant et al. |
| 2012/0215763 A1 | 8/2012 | Hughes et al. |
| 2012/0221540 A1 | 8/2012 | Rose et al. |
| 2012/0254175 A1 | 10/2012 | Horowitz et al. |
| 2012/0274664 A1 | 11/2012 | Fagnou |
| 2012/0320914 A1 | 12/2012 | Thyni et al. |
| 2013/0019296 A1 | 1/2013 | Brandenburg |
| 2013/0151477 A1 | 6/2013 | Tsaur et al. |
| 2013/0151558 A1 | 6/2013 | Chércoles Sánchez et al. |
| 2013/0179450 A1 | 7/2013 | Chitiveli |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2013/0346366 A1 | 12/2013 | Ananthanarayanan et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0180723 A1 | 6/2014 | Cote et al. |

(56) References Cited

U.S. PATENT DOCUMENTS

| | | |
|---|---|---|
| 2014/0201267 A1 | 7/2014 | Yang |
| 2014/0258343 A1* | 9/2014 | Nikula ............... G06F 16/2379 707/803 |
| 2014/0279929 A1 | 9/2014 | Gupta et al. |
| 2014/0280380 A1 | 9/2014 | Jagtap et al. |
| 2014/0289197 A1 | 9/2014 | Webber et al. |
| 2015/0012797 A1 | 1/2015 | Leggette et al. |
| 2015/0016300 A1 | 1/2015 | Devireddy et al. |
| 2015/0074041 A1 | 3/2015 | Bhattacharjee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1 | 11/2015 | Morgan |
| 2015/0341212 A1 | 11/2015 | Hsiao et al. |
| 2015/0378786 A1 | 12/2015 | Suparna et al. |
| 2015/0378825 A1 | 12/2015 | Resch |
| 2016/0005423 A1 | 1/2016 | Neppalli et al. |
| 2016/0042008 A1 | 2/2016 | Tripathy et al. |
| 2016/0048345 A1 | 2/2016 | Vijayrao et al. |
| 2016/0110284 A1 | 4/2016 | Athalye et al. |
| 2016/0110414 A1 | 4/2016 | Park et al. |
| 2016/0162354 A1 | 6/2016 | Singhai et al. |
| 2016/0162374 A1 | 6/2016 | Mutha et al. |
| 2016/0188377 A1 | 6/2016 | Thimmappa et al. |
| 2016/0198044 A1 | 7/2016 | Gruchala et al. |
| 2016/0203202 A1 | 7/2016 | Merriman et al. |
| 2016/0246861 A1 | 8/2016 | Merriman et al. |
| 2016/0253109 A1 | 9/2016 | Litke et al. |
| 2016/0306709 A1 | 10/2016 | Shaull |
| 2016/0323378 A1 | 11/2016 | Coskun et al. |
| 2016/0364440 A1 | 12/2016 | Lee et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Stearn et al. |
| 2017/0109399 A1 | 4/2017 | Stearn et al. |
| 2017/0109421 A1 | 4/2017 | Stearn et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004801 A1 | 1/2018 | Burchall et al. |
| 2018/0004804 A1 | 1/2018 | Merriman et al. |
| 2018/0095852 A1 | 4/2018 | Keremane et al. |
| 2018/0096045 A1 | 4/2018 | Merriman et al. |
| 2018/0096066 A1 | 4/2018 | Venkataramanappa et al. |
| 2018/0150230 A1 | 5/2018 | Schreter |
| 2018/0165338 A1 | 6/2018 | Kumar et al. |
| 2018/0173745 A1 | 6/2018 | Balasubramanian et al. |
| 2018/0176300 A1 | 6/2018 | Chen et al. |
| 2018/0300203 A1 | 10/2018 | Kathpal et al. |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0343131 A1 | 11/2018 | George et al. |
| 2018/0365114 A1 | 12/2018 | Horowitz |
| 2019/0102410 A1 | 4/2019 | Horowitz et al. |
| 2019/0303382 A1 | 10/2019 | Bostic et al. |
| 2020/0097486 A1 | 3/2020 | Horowitz et al. |
| 2020/0099392 A1 | 3/2020 | Hecker et al. |
| 2020/0160297 A1 | 5/2020 | Munk |
| 2020/0285549 A1 | 9/2020 | Horowitz et al. |
| 2020/0295925 A1 | 9/2020 | Horowitz et al. |
| 2020/0327021 A1 | 10/2020 | Horowitz et al. |
| 2020/0341867 A1 | 10/2020 | Horowitz et al. |
| 2020/0409804 A1 | 12/2020 | Horowitz et al. |

OTHER PUBLICATIONS

U.S. Appl. No. 15/721,176, filed Sep. 29, 2017, Merriman et al.
U.S. Appl. No. 16/890,948, filed Jun. 2, 2020, Merriman et al.
U.S. Appl. No. 16/294,227, filed Mar. 6, 2019, Bostic et al.
U.S. Appl. No. 15/605,143, filed May 25, 2017, Horowitz.
U.S. Appl. No. 15/604,879, filed May 25, 2017, Horowitz.
U.S. Appl. No. 15/604,856, filed May 25, 2017, Horowitz et al.
U.S. Appl. No. 17/083,238, filed Oct. 28, 2020, Horowitz et al.
U.S. Appl. No. 16/883,653, filed May 26, 2020, Horowitz et al.
U.S. Appl. No. 16/912,963, filed Jun. 26, 2020, Horowitz et al.
U.S. Appl. No. 16/456,685, filed Jun. 28, 2019, Horowitz et al.
U.S. Appl. No. 15/627,672, filed Jun. 20, 2017, Horowitz et al.
U.S. Appl. No. 16/846,916, filed Apr. 13, 2020, Horowitz et al.
U.S. Appl. No. 17/018,475, filed Sep. 11, 2020, Horowitz et al.
U.S. Appl. No. 16/013,345, filed Jun. 20, 2018, Horowitz.
U.S. Appl. No. 15/627,631, filed Jun. 20, 2017, Horowitz et al.
U.S. Appl. No. 15/627,656, filed Jun. 20, 2017, Horowitz et al.
U.S. Appl. No. 16/013,720, filed Jun. 20, 2018, Horowitz et al.
U.S. Appl. No. 16/013,706, filed Jun. 20, 2018, Merriman et al.
U.S. Appl. No. 16/013,725, filed Jun. 20, 2018, Merriman et al.
[No Author Listed], Automated Administration Tasks (SQL Server Agent). https://docs.microsoft.com/en-us/sql/ssms/agent/automated-adminsitration-tasks-sql-server-agent. 2 pages, [downloaded Mar. 4, 2017].
Chang et al., Bigtable: a distributed storage system for structured data. OSDI'06: Seventh Symposium on Operating System Design and Implementation. Nov. 2006.
Cooper et al., PNUTS: Yahoo!'s hosted data serving platform. VLDB Endowment. Aug. 2008.
Decandia et al., Dynamo: Amazon's highly available key-value store. SOSP 2007. Oct. 2004.
Nelson et al., Automate MongoDB with MMS. PowerPoint Presentation. Published Jul. 24, 2014. 27 slides, http://www.slideshare.net/mongodb/mms-automation-mongo-db-world.
Ongaro et al., In Search of an Understandable Consensus Algorithm Proceedings of USENIX ATC '14: 2014 USENIX Annual Technical Conference. Philadelphia, PA. Jun. 19-20, 2014; pp. 305-320.
Poder, Oracle living books. 2009. <http://tech.e2sn.com/oracle/sql/oracle-execution-plan-operation-reference >.
Stirman, Run MongoDB with Confidence using MMS. PowerPoint Presentation. Published Oct. 6, 2014. 34 slides, http://www.slideshare.net/mongodb/mongo-db-boston-run-mongodb-with-mms-20141001.
Van Renesse et al., Chain replication for supporting high throughput and availability. OSDI. 2004: 91-104.
Walsh et al., Xproc: An XML Pipeline Language. May 11, 2011. <https://www.w3.org/TR/xproc/>.
Wikipedia, Dataflow programming. Oct. 2011. <http://en.wikipedia.org/wiki/Dataflow_programming>.
Wikipedia, Pipeline (Unix). Sep. 2011. <http://en.wikipedia.org/wiki/Pipeline (Unix)>.
Wilkins et al., Migrate DB2 applications to a partitioned database. developerWorks, IBM. Apr. 24, 2008, 33 pages.
U.S. Appl. No. 17/541,890, filed Dec. 3, 2021, Horowitz et al.

\* cited by examiner

SYSTEMS AND METHODS FOR HIERARCHICAL KEY MANAGEMENT IN ENCRYPTED DISTRIBUTED DATABASES

RELATED APPLICATIONS

This Application is a division of and claims the benefit under 35 U.S.C. § 120 to U.S. application Ser. No. 15/605,512, entitled "SYSTEMS AND METHODS FOR HIERARCHICAL KEY MANAGEMENT IN ENCRYPTED DISTRIBUTED DATABASES" filed on May 25, 2017. U.S. application Ser. No. 15/605,512 claims the benefit under 35 U.S.C. § 120 of U.S. application Ser. No. 15/604,856, entitled "DISTRIBUTED DATABASE SYSTEMS AND METHODS WITH ENCRYPTED STORAGE ENGINES" filed on May 25, 2017, which is herein incorporated by reference in its entirety. Application Ser. No. 15/604,856 claims priority under 35 U.S.C. § 119(e) to U.S. Provisional Application Ser. No. 62/343,440, entitled "SYSTEMS AND METHODS FOR HIERARCHICAL KEY MANAGEMENT IN ENCRYPTED DISTRIBUTED DATABASES" filed on May 31, 2016, which is herein incorporated by reference in its entirety. Application Ser. No. 15/604,856 claims priority under 35 U.S.C. § 119(e) to U.S. Provisional Application Ser. No. 62/341,453, entitled "SYSTEMS AND METHODS FOR KEY MANAGEMENT IN ENCRYPTED DISTRIBUTED DATABASES" filed on May 25, 2016, which is herein incorporated by reference in its entirety. Application Ser. No. 15/604,856 claims the benefit under 35 U.S.C. § 120 of U.S. application Ser. No. 14/992,225, entitled "DISTRIBUTED DATABASE SYSTEMS AND METHODS WITH PLUGGABLE STORAGE ENGINES" filed on Jan. 11, 2016, which is herein incorporated by reference in its entirety. Application Ser. No. 14/992,225 claims priority under 35 U.S.C. § 119(e) to U.S. Provisional Application Ser. No. 62/232,979, entitled "DISTRIBUTED DATABASE SYSTEMS AND METHODS WITH PLUGGABLE STORAGE ENGINES" filed on Sep. 25, 2015, which is herein incorporated by reference in its entirety. Application Ser. No. 15/605,512 claims priority under 35 U.S.C. § 119(e) to U.S. Provisional Application Ser. No. 62/343,440, entitled "SYSTEMS AND METHODS FOR HIERARCHICAL KEY MANAGEMENT IN ENCRYPTED DISTRIBUTED DATABASES" filed on May 31, 2016, which is herein incorporated by reference in its entirety. Application Ser. No. 15/605,512 claims priority under 35 U.S.C. § 119(e) to U.S. Provisional Application Ser. No. 62/341,453, entitled "SYSTEMS AND METHODS FOR KEY MANAGEMENT IN ENCRYPTED DISTRIBUTED DATABASES" filed on May 25, 2016, which is herein incorporated by reference in its entirety.

BACKGROUND

Technical Field

The present invention relates to distributed database systems and methods for securely encrypting both the data stored in the databases and the encryption keys used to encrypt the data.

Background Discussion

Encryption techniques exist for database systems storing sensitive or confidential material. Individual databases may be encrypted using internal database keys, and the internal database keys themselves may be encrypted using a master key that are stored locally or at a key management server.

SUMMARY

Conventional approaches to encrypting databases involve the use of internal database keys. The internal database keys may be stored locally and used to encrypt and decrypt the database as needed. Because those internal database keys provide access to any sensitive information stored in the database, the internal database keys themselves may need to be stored in an encrypted file or otherwise securely stored.

Various aspects are provided for management of internal and external database encryption keys. According to an embodiment, management interfaces and processes are provided that automate time consuming and error-prone operations, including, for example, key rotation operations. In these embodiments, key management functions can be executed with no downtime, in that data can be accessed during the key rotation. A single master key may be used to encrypt and decrypt the internal database keys. The master key may be stored locally in an encrypted keyfile, or may be stored at a (possibly third party) key management server and requested as needed. When the master key is received, it is stored temporarily in memory as opposed to permanent storage, thereby reducing the risk of a security breach.

Security breaches, as well as regulatory requirements, may require that the master key and/or the internal database keys be rotated, or changed, on occasion or on a particular schedule (e.g., once a year). During such a change event, the master key may be used to decrypt the internal database keys. If desired, the internal database keys can then be used to decrypt the database itself; new internal database keys can be generated and used to re-encrypt the database. A new master key may also be generated and used to re-encrypt the internal database keys, whether or not they have changed.

Performing such a "key rotation" may require that the database be unavailable for read/write operations for some period of time, as the database and the keys must be available in an unencrypted format during the process, thereby creating a potential security issue. This downtime creates additional issues where the master key and/or internal database keys of more than one database node need to be changed. For example, where a high level of performance and availability is required, database systems may be arranged as replica sets, in which a number of nodes storing the same information are available to respond to database operations (e.g., read and write requests). Replica sets may be configured to include a primary node and a number of secondary nodes. The primary node contains the definitive version of the data stored therein, and may be where any write operations are initially performed. Any write operations or other changes to the primary node are eventually propagated to the second nodes, which may be configured to handle read operations according to load balancing and other considerations.

According to one aspect, in a database incorporating such replica sets, there is therefore a need for a system and method for rotating the master key and/or internal database keys while maintaining availability to the data stored in the replica set. In some embodiments, a process is provided for rotating the keys of a node within the replica set while maintaining the availability to the rest of the replica set, and repeating the process for each node while continuing to maintain that availability.

According to one aspect a distributed database system is provided. The system comprises at least a first database node hosting data of the database system, at least one internal database key, at least one database configured to be encrypted and decrypted using the at least one internal database key comprising at least a portion of the data of the distributed database system, a memory configured to store a master key, a key management server interface configured to communicate with a key management server, and a database application configured to, receive, into the memory, the master key from the key management server via the key management server interface, and encrypt and decrypt the at least one internal database key using the master key.

According to one embodiment, the system further comprises a storage engine configured to write encrypted data to the at least one database, the encrypted data generated with reference to the at least one internal database key. According to one embodiment, the database application is further configured to manage key rotation functions for the at least one database. According to one embodiment, the key rotation functions are performed on the database while the database is available for read and write operations. According to one embodiment, the database application is further configured to perform a key rotation function on a node in a replica set by performing the key rotation function on a first secondary node. According to one embodiment, the database application is further configured to perform a key rotation function on a node in a replica set by performing the key rotation function on a second secondary node. According to one embodiment, the database application is further configured to, demote a current primary node to be a secondary node of the replica set, and elect one of the first secondary node and the second secondary node to be a next primary node of the replica set.

According to one aspect a distributed database system is provided. The system comprises at least a first database node hosting data of the database system, at least one database instance configured to be encrypted and decrypted using at least one internal database key comprising at least a portion of the data of the distributed database system, a stored keyfile, a database application configured to encrypt and decrypt the at least one internal database key using the stored keyfile, and a storage engine configured to write encrypted data to the at least one database, the encrypted data generated with reference to the at least one internal database key.

According to one aspect a method for modifying an encryption scheme of a database system is provided. The method comprises disabling read and write access to a node of a replica set, for at least one database on the node of a replica set, decrypting an internal database key using a first master key, obtaining a second master key, for the at least one database on the node of the replica set, encrypting the internal database key using the second master key, restoring read and write access to the node of the replica set, repeating steps (A)-(E) for at least one other node of the replica set in a rolling manner. According to one embodiment, the second master key is obtained from a key management server, and the method further comprises receiving the second master key via a key management interoperability protocol (KMIP). According to one embodiment, the second master key is obtained from a key management server, and the method further comprising receiving the second master key via an Application Programming Interface (API).

According to one aspect a method for modifying an encryption scheme of a database system is provided. The method comprises, disabling read and write access to a node of a replica set, for at least one database on the node of a replica set, decrypting a first internal database key using a first master key, decrypting the at least one database using the first internal database key, generating a second internal database key for each of the at least one database, encrypting the at least one database using the second internal database key for the at least one database, obtaining a second master key, encrypting the second internal database key for the at least one database using the second master key, restoring read and write access to the node of the replica set, repeating steps (A)-(H) for at least one other node of the replica set in a rolling manner. According to one embodiment, the act of obtaining the second master key comprises requesting the second master key from a key management server via a key management interoperability protocol (KMIP).

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure.

In the figures.

DETAILED DESCRIPTION

Figure 1:
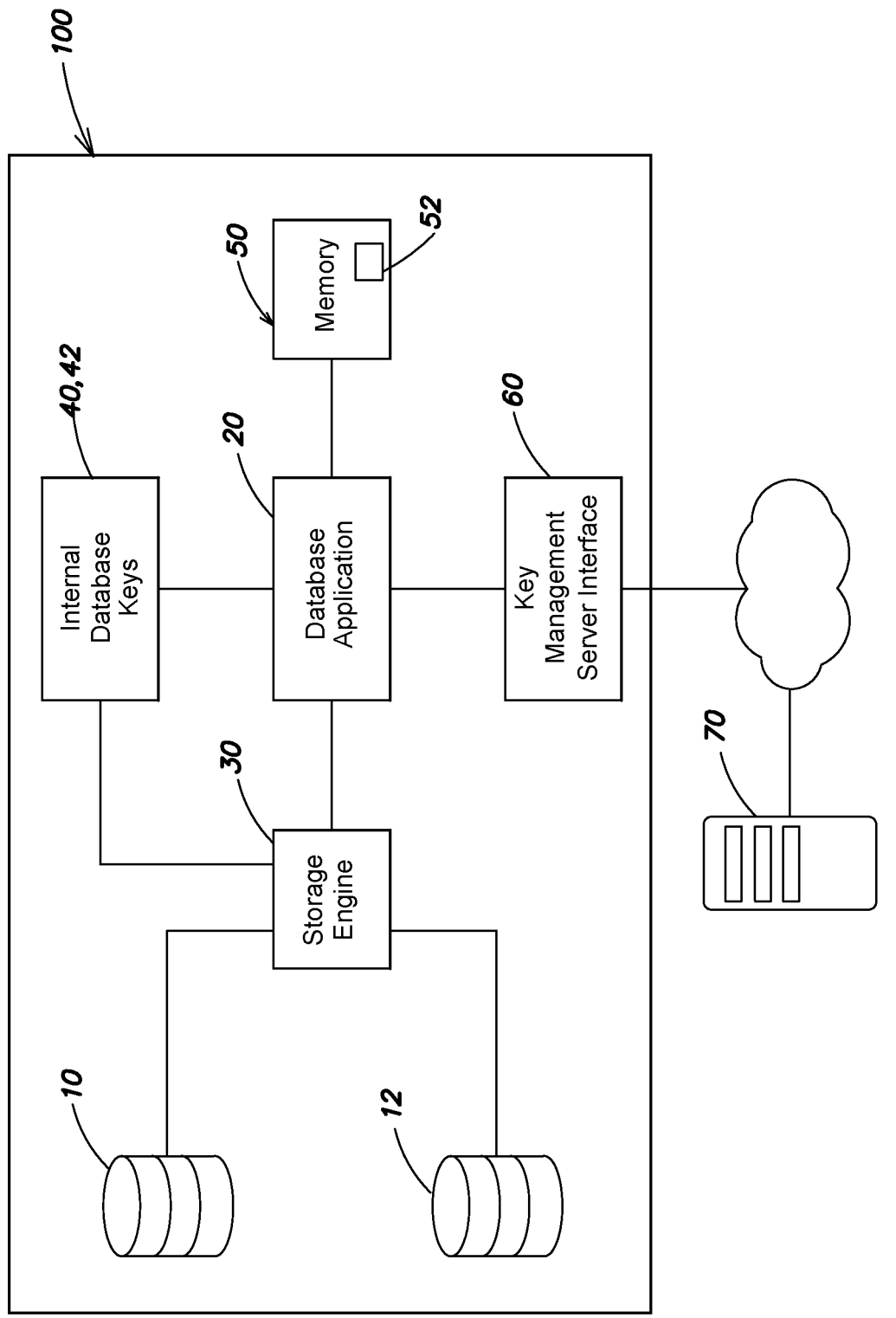
FIG. 1 illustrates a block diagram of an example architecture for a storage node, according to aspects of the invention.

According to various embodiments, a system and method are provided for modifying the encryption scheme of a database system by sequentially rotating the keys of each node in a replica set, while the replica set remains available for normal read/write operations. In a preferred embodiment where a master key is stored at a key management server, a database node is removed from normal operation, and the master key is obtained, such as with a Key Management Interoperability Protocol (KMIP) request, and used to decrypt one or more internal database keys. A new master key is then generated and/or obtained and used to re-encrypt the one or more internal database keys. In such an embodiment, only a new master key may be generated, and used to re-encrypt the (previously used) internal database keys.

In another embodiment, where the master key is stored locally in a keyfile, responsibility for securing the master key is on the system administrator or other user. In some embodiments, it may be desirable to rotate both the master key and the internal database keys. Accordingly, a database node is removed from normal operation, and the master key is obtained from the keyfile (e.g., local or remote keys) and used to decrypt one or more internal database keys. The internal database keys are then used to decrypt the database itself. New internal database keys are generated and used to re-encrypt the database, and a new master is generated and used to re-encrypt the new one or more internal database keys.

According to one aspect, an encryption management system provides functions and user interfaces for managing encryption schemes for a database. According to some embodiments, the system automates key management functions (e.g., key rotation) to reduce error in execution, improve execution efficiency of the computer system, and provide user-configurable compliance options for managing encryption keys, among other options. For example, the user can set a timetable for key rotation, that is automatically executed by the system. In another embodiment, the user can also establish settings for a type of key rotation (e.g., full rotation or internal key rotations, etc.).

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

An example of a database storage node 100 is shown in FIG. 1. The storage node 100 represents a subsystem (e.g., a server) on which a particular set or subset of data may be stored, as well as functional components for interacting with the data. For example, the storage node 100 may be a standalone database, or may be a primary node or a secondary node within a replica set, wherein particular data is stored by more than one node to ensure high availability and stability in the event that one or more nodes becomes unavailable for some period of time. In other embodiments, the storage node 100 may be a shard server storing a certain range of data within a database system.

The storage node 100 may be arranged as a relational database, or as a non-relational database, such as the MongoDB database system offered by MongoDB, Inc. of New York, N.Y. and Palo Alto, Calif. The storage node 100 includes a database 10 configured to store the primary data of a database. In a preferred embodiment, the storage node 100 is a non-relational database system wherein the database 10 stores one or more collections of documents allowing for dynamic schemas. In such scenarios, a "document" is a collection of attribute-value associations relating to a particular entity, and in some examples forms a base unit of data storage for the managed database system. Attributes are similar to rows in a relational database, but do not require the same level of organization, and are therefore less subject to architectural constraints. A collection is a group of documents that can be used for a loose, logical organization of documents. It should be appreciated, however, that the concepts discussed herein are applicable to relational databases and other database formats, and this disclosure should not be construed as being limited to non-relational databases in the disclosed embodiments.

In one example, the database data may include logical organizations of subsets of database data. The database data may include index data, which may include copies of certain fields of data that are logically ordered to be searched efficiently. Each entry in the index may consist of a key-value pair that represents a document or field (i.e., the value), and provides an address or pointer to a low-level disk block address where the document or field is stored (the key). The database data may also include an operation log ("oplog"), which is a chronological list of write/update operations performed on the data store during a particular time period. The oplog can be used to roll back or re-create those operations should it become necessary to do so due to a database crash or other error. Primary data, index data, or oplog data may be stored in any of a number of database formats, including row store, column store, log-structured merge (LSM) tree, or otherwise.

In other embodiments, the storage node 100 forms or is a member of a relational database system, and the database 10 stores one or more tables comprising rows and columns of data according to a database schema.

The storage node 100 further comprises a database application 20 that handles data requests, manages data access, and performs background management operations for the storage node 100. The database application 20 is configured to interact with various components of the storage node 100, including at least one storage engine 30 for writing data to the database 10. In one embodiment, the at least one storage engine 30 writes data to the database in an encrypted format. In particular, the storage engine 30 is configured to write unencrypted data (i.e., plaintext) in an encrypted format to the database 10 using an encryption algorithm that uses a randomly-generated internal database key 40 as an input. In a preferred embodiment, the internal database key 40 is a symmetric database key such that the same key is used to encrypt and decrypt the data. Such symmetric database keys are used in connection with symmetric encryption/decryption algorithms such as Twofish, Serpent, AES (Rijndael), Blowfish, CAST5, RC4, 3DES, Skipjack, Safer+/++ (Bluetooth), and IDEA. In a preferred embodiment, the storage engine 30 uses a symmetric internal database key 40 to perform 256 bit encryption using AES-256 in cipher block chaining (CBC) mode (e.g., via OpenSSL), or in Galois/Counter (GCM) mode. In other embodiments, the internal database key 40 may be part of a public key cryptographic scheme.

A storage node 100 may include more than one database. For example, FIG. 1 shows a second database 12, and a corresponding internal database key 42. According to one embodiment, for security purposes, it can be preferable to use a unique internal database key for each database. Thus, for example, internal database key 40 could be used to encrypt and decrypt only database 10, which in turn may only be encrypted and decrypted using internal database key 40. Similarly, internal database key 42 could be used to encrypt and decrypt only database 12, which in turn may only be encrypted and decrypted using internal database key 42. It will be appreciated that any number of databases and corresponding unique internal database keys may be provided on a storage node 100 without departing from the spirit of the invention.

According to one embodiment, the internal database keys 40, 42 can be stored on a disk or other storage in the storage node 100, and are generally kept encrypted except for the period of time during which they have are actually being used. Because the symmetric internal database keys 40, 42 of the preferred embodiment allow for the encryption and decryption of the databases 10, 12, the internal database keys 40, 42 themselves must also be stored in an encrypted format to avoid unauthorized parties obtaining and using them. In one embodiment, the internal database keys 40, 42 are encrypted with a master key 52 that, for security purposes, is maintained only in a temporary memory 50 as needed and is never paged or written to disk.

In some embodiments, a master key and/or internal keys (e.g., 52, 40, 42) can be stored on a separate key management system and requested at each use, or initialized with a first request and maintained only in a temporary memory (e.g., 50) as needed and which configured to prevent paging or writing of keys to disk.

In one embodiment, the master key 52 is also a randomly-generated symmetric key that is maintained by and obtained from a key management server 70 (e.g., operated by a third party) via a key management server interface 60. The key management server interface 60 is a network interface capable of communicating with other systems in a network, such as the Internet. For example, the key management server interface 60 may comprise a KMIP appliance or client capable of communicating with the key management server 70 for the sending and receiving of a master key 52. Examples of such KMIP clients include KeySecure, offered by Gemalto (formerly SafeNet) of Belcamp, Md., and Data Security Manager (DSM), offered by Vormetric, Inc. of San Jose, Calif. In other implementations, the database and the key management server and interface can be implanted on cloud resources. In on example, any database components and any key management components can be instantiated as a private cloud and/or can be configured for secure communication.

The database application 20 may obtain the master key 52 via the key management server interface 60 using a suitable protocol or application programming interface. For example, the database application 20 may communicate a request for the master key 52 to the key management server 70 using a KMIP that defines message formats for accessing and manipulating cryptographic keys on a key management server 70. In another example, the database application 20 may obtain the master key 52 by making an application call to an Application Programming Interface (API) on the key management server 70, such as the Public Key Cryptography Standards, Standard #11 (PKCS #11). In further embodiments, the database application itself can be one or more application programming interfaces or include one or more application programming interface, wherein at least one of the APIs is configured to call an respective API on the key management server. For example, to obtain a master key or in another example to obtain master and/or local keys. In other examples, the database application can request new keys and trigger key rotation within the database.

According to some embodiments, database administrators can access the system and establish a key rotation schedule, which the system is configured to automatically execute. In further embodiments, the system accepts specification of a time-table to rotate master keys and/or a time-table to rotation internal keys, and further specification of rotation of both master and internal keys. Once the type of rotation and time frame is set the system can automatically perform the rotations operations without user intervention. The type of rotation and time frame can be set by administrator users, and/or can be set by default upon creation of a given database or database instance.

According to one embodiment, the system is configured to execute any selected rotation functions transparently to the end users. For example, key rotation can be scheduled by the system and in anticipation of a set time/date within the time-table so that rotation occurs in least utilized times. In further embodiments, and in particular when completing full rotation (e.g., internal key rotation), the system can be configured to instantiate new database resources (e.g., cloud resources) to host at least one copy of a secondary node. The copy of the secondary node can serve any one or more of multiple purposes: (1) ensuring no failure results in data loss (e.g., failed re-encryption can result in an unrecoverable data state); (2) and no significant downtime (e.g., as a failover secondary node in the event of a failed re-encryption); (3) providing same level of service to clients during rotation (e.g., full rotation takes a node off-line to decrypt and re-encrypt the instance) by serving database requests from the copy; and (4) simplify recovery operations (e.g., failed rotation on secondary can simply de-commission failed secondary), among other options.

Co-pending patent application Ser. No. 14/969,537, entitled Systems and Methods for Automating Management of Distributed Databases, filed on Dec. 15, 2015, incorporated by reference in its entirety, describes various aspects and embodiments of automation systems that can be implemented to facilitate generation of new nodes in a replica set, and/or manage new node resources during key rotation functions discussed herein.

Figure 2:
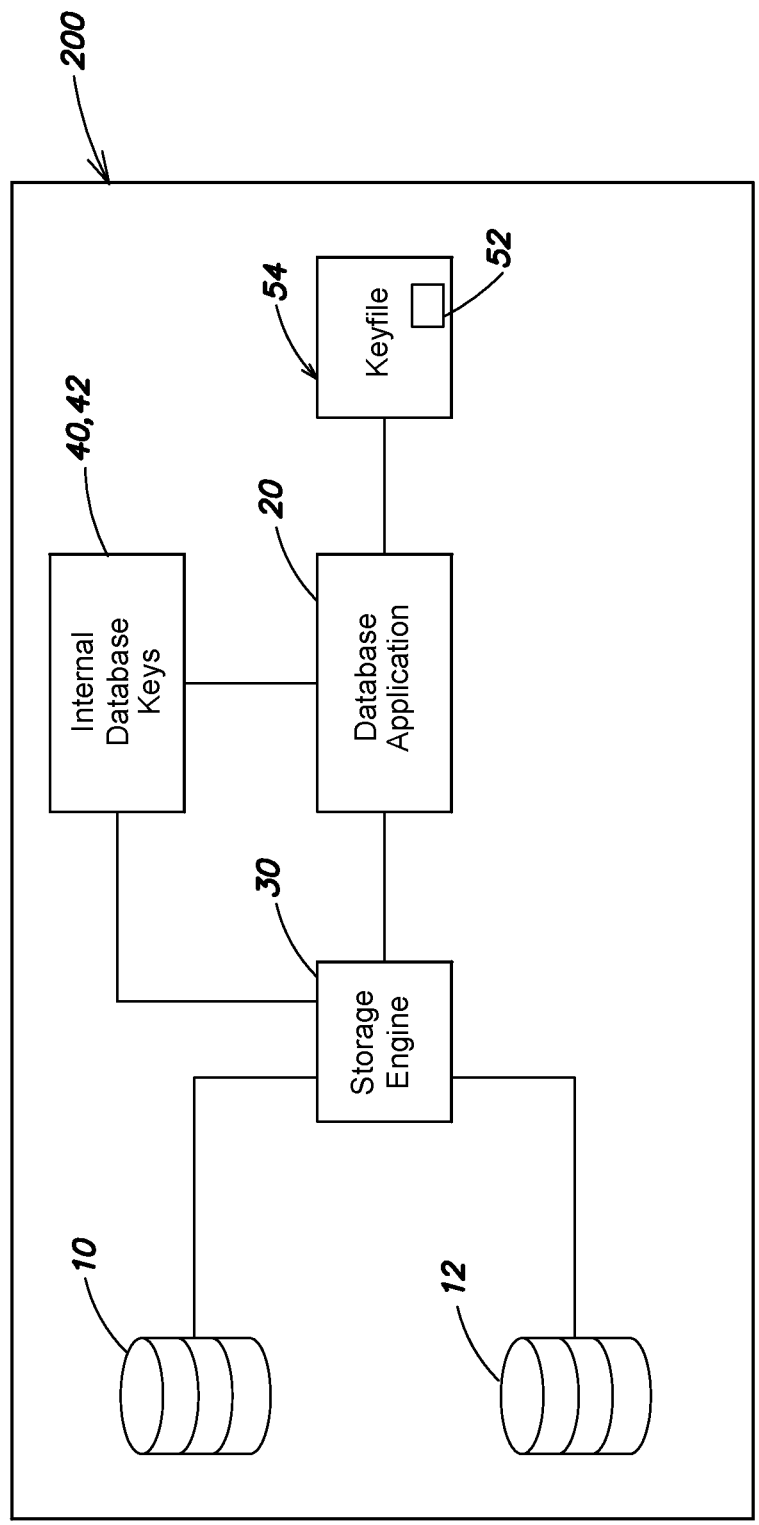
FIG. 2 illustrates a block diagram of an example architecture for a storage node, according to aspects of the invention.

FIG. 2 depicts another exemplary storage node 200. Storage node 200 includes many of the same components and functions similarly to storage node 100, but need not include a key management server interface. In this embodiment, a master key is not obtained from a key management server 70, as in the storage node 100. Rather, a locally-stored and managed keyfile 54 stores the master key 52 that is used to encrypt and decrypt the internal database keys 40, 42. The keyfile 54 may store the master key 52 as a based64 encoded 16- or 32-character string.

Figure 3:
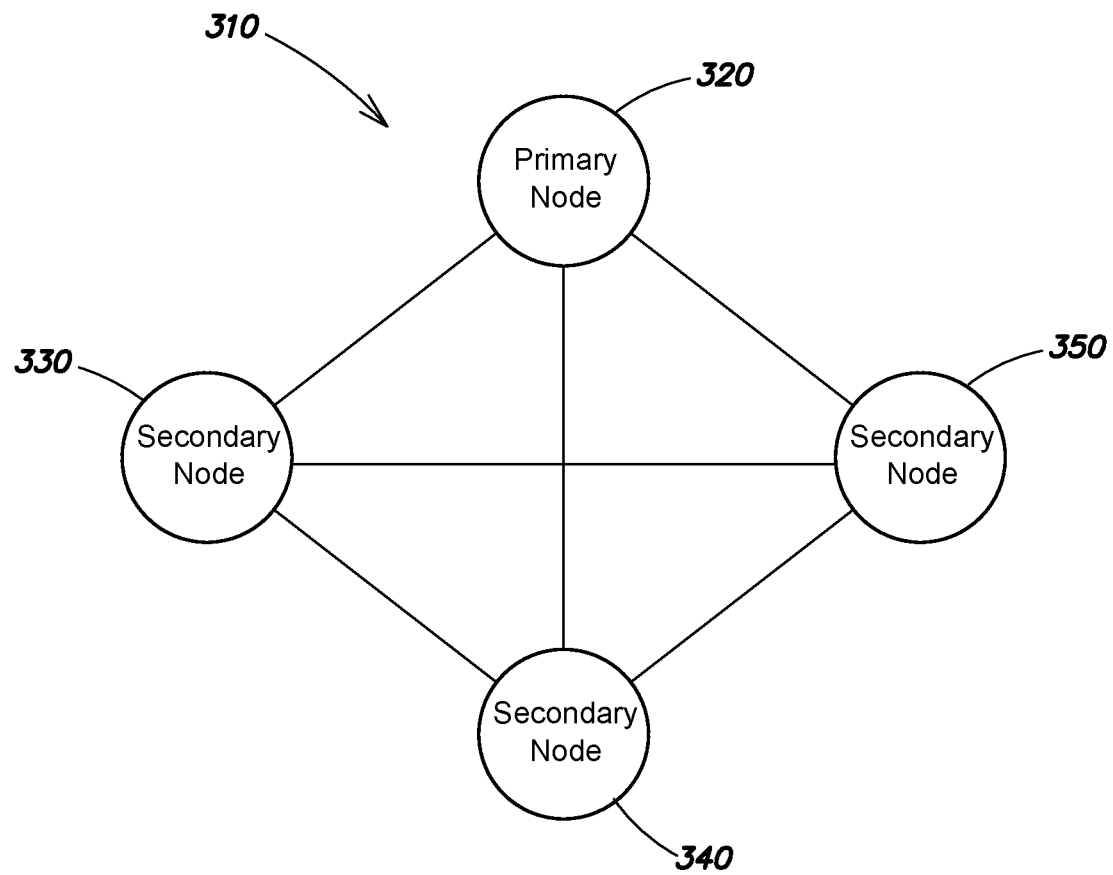
FIG. 3 illustrates a block diagram of an example architecture for a database replica set, according to aspects of the invention.

The embodiments shown and discussed with respect to FIGS. 1 and 2 depict a single database storage node 100 or 200. Yet in some embodiments, multiple storage nodes may be provided and arranged in a replica set, such as the embodiments described in U.S. patent application Ser. No. 12/977,563, which is hereby incorporated by reference in its entirety. FIG. 3 shows a block diagram of an exemplary replica set 300. Replica set 310 includes a primary node 320 and one or more secondary nodes 330, 340, 350, each of which is configured to store a dataset that has been inserted into the database. The primary node 320 may be configured to store all of the documents currently in the database, and may be considered and treated as the authoritative version of the database in the event that any conflicts or discrepancies arise, as will be discussed in more detail below. While three secondary nodes 330, 340, 350 are depicted for illustrative purposes, any number of secondary nodes may be employed, depending on cost, complexity, and data availability requirements. In a preferred embodiment, one replica set may be implemented on a single server, or a single cluster of servers. In other embodiments, the nodes of the replica set may be spread among two or more servers or server clusters.

The primary node 320 and secondary nodes 330, 340, 350 may be configured to store data in any number of database formats or data structures as are known in the art. In a preferred embodiment, the primary node 320 is configured to store documents or other structures associated with non-relational databases. The embodiments discussed herein relate to documents of a document-based database, such as those offered by MongoDB, Inc. (of New York, N.Y. and Palo Alto, Calif.), but other data structures and arrangements are within the scope of the disclosure as well.

In one embodiment, both read and write operations may be permitted at any node (including primary node 320 or secondary nodes 330, 340, 350) in response to requests from clients. The scalability of read operations can be achieved by adding nodes and database instances. In some embodiments, the primary node 320 and/or the secondary nodes 330, 340, 350 are configured to respond to read operation requests by either performing the read operation at that node or by delegating the read request operation to another node (e.g., a particular secondary node 330). Such delegation may be performed based on load-balancing and traffic direction techniques known in the art.

In some embodiments, the database only allows write operations to be performed at the primary node 320, with the secondary nodes 330, 340, 350 disallowing write operations. In such embodiments, the primary node 320 receives and processes write requests against the database, and replicates the operation/transaction asynchronously throughout the system to the secondary nodes 330, 340, 350. In one example, the primary node 320 receives and performs client write operations and generates an oplog. Each logged operation is replicated to, and carried out by, each of the secondary nodes 330, 340, 350, thereby bringing those secondary nodes into synchronization with the primary node 320.

In some embodiments, the primary node 320 and the secondary nodes 330, 340, 350 may operate together to form a replica set 310 that achieves eventual consistency, meaning that replication of database changes to the secondary nodes 330, 340, 350 may occur asynchronously. When write operations cease, all replica nodes of a database will eventually "converge," or become consistent. This may be a desirable feature where higher performance is important, such that locking records while an update is stored and propagated is not an option. In such embodiments, the secondary nodes 330, 340, 350 may handle the bulk of the read operations made on the replica set 310, whereas the primary node 330, 340, 350 handles the write operations. For read operations where a high level of accuracy is important (such as the operations involved in creating a secondary node), read operations may be performed against the primary node 320.

It will be appreciated that the difference between the primary node 320 and the one or more secondary nodes 330, 340, 350 in a given replica set may be largely the designation itself and the resulting behavior of the node; the data, functionality, and configuration associated with the nodes may be largely identical, or capable of being identical. Thus, when one or more nodes within a replica set 310 fail or otherwise become available for read or write operations, other nodes may change roles to address the failure. For example, if the primary node 320 were to fail, a secondary node 330 may assume the responsibilities of the primary node, allowing operation of the replica set to continue through the outage. This failover functionality is described in U.S. application Ser. No. 12/977,563, the disclosure of which has been incorporated by reference.

Each node in the replica set 310 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 320 may be connected by a LAN, a WAN, or other connection to one or more of the secondary nodes 330, 340, 350, which in turn may be connected to one or more other secondary nodes in the replica set 310. Connections between secondary nodes 330, 340, 350 may allow the different secondary nodes to communicate with each other, for example, in the event that the primary node 320 fails or becomes unavailable and a secondary node must assume the role of the primary node.

Each of the primary node 320 and the secondary nodes 330, 340, and 350 may operate like the storage nodes 100 or 200 in FIGS. 1 and 2, respectively. In a preferred embodiment, the databases on each node are individually encrypted using unique internal database keys, with the unique internal database keys themselves being encrypted using a master key unique to each node. Put differently, a master key used on a given node is preferably different than every other master key used on any other node. Likewise, a unique internal database key used to encrypt a given database on a node is preferably different than every other unique internal database key used on that node or any other node (e.g., the unique internal database key used on database A on a primary node will be different than the unique internal database key used on database A on a secondary node within the same replica set). In other embodiments, the same master key may be used for all nodes in a replica set, and/or the same unique internal database key may be used on multiple databases across one or multiple nodes or replica sets.

For security reasons, it may be desirable to change the master keys and internal database keys used in a particular node or replica set. Such a change may be carried out periodically, in response to a security concern, or on a schedule dictated by regulatory or other frameworks. For a change to a new master key to be implemented, at least the internal database keys must be decrypted as necessary and then re-encrypted using the new master key. For a change to new internal database keys to be implemented, the data in the databases itself must be decrypted as appropriate using the current internal database keys, then re-encrypted using the new internal database keys. The new internal database keys must themselves then be re-encrypted using the new master key (or existing master key, if no change to the master key has occurred).

Due to the decryption/encryption steps required in changing the master key and/or the internal database keys used on a particular node, including the security issues introduced by process of changing the encryption scheme, the node is typically taken offline while the keys are changed, with other nodes in the replica set available to handle database requests while the node is unavailable. When some or all of the nodes in a replica set are due to have their master keys and/or internal database keys changed, the process may be carried out in a sequential or rolling manner, with nodes taken offline one at a time, their keys changed, and the node returned to service. Once the node has returned to availability for processing database requests, another node may be taken offline to repeat the process, and so on. In this way, some or all of the nodes in a replica set may have their encryption schemes changed in a rolling process.

Figure 4:
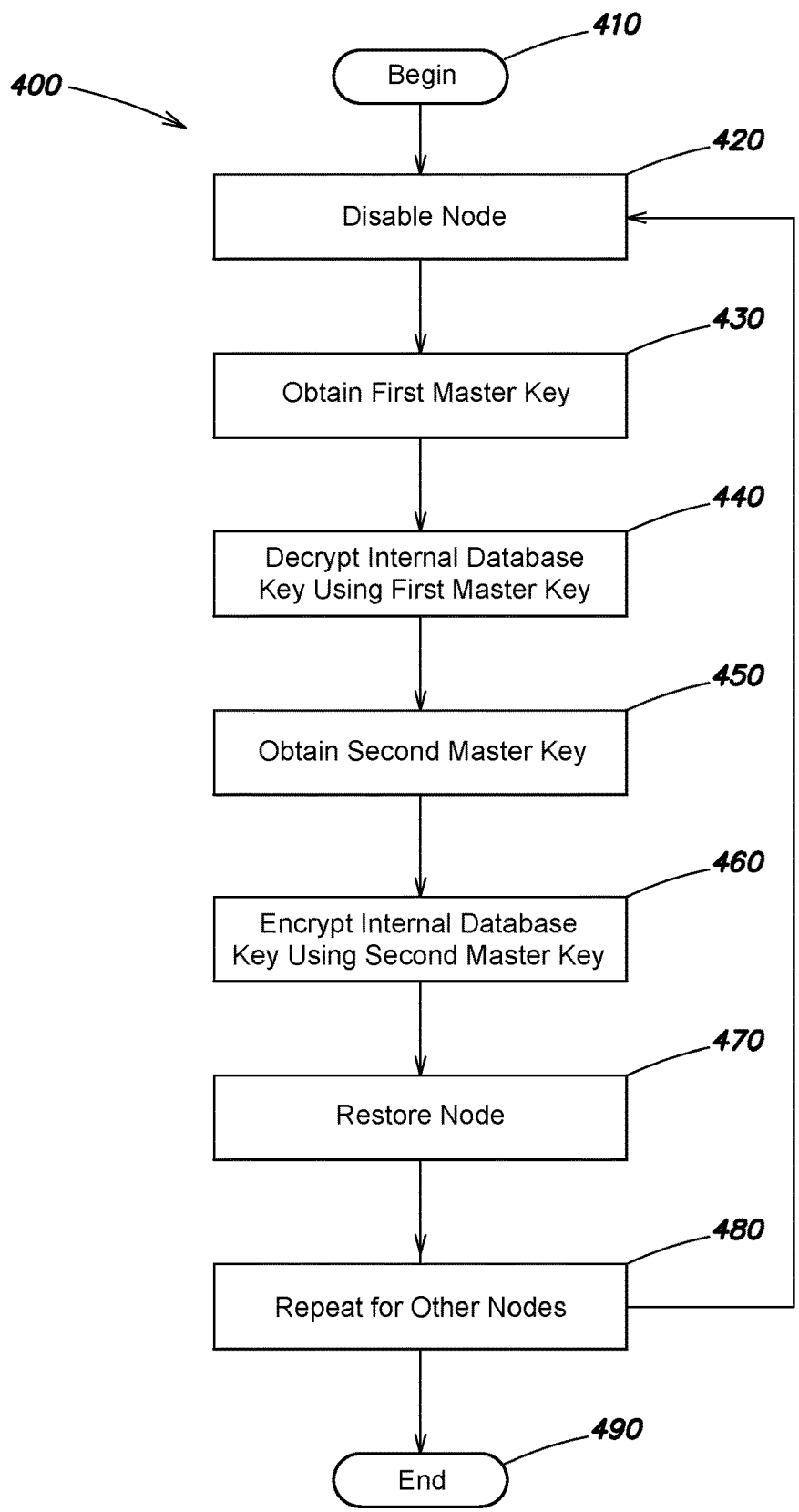
FIG. 4 illustrates an example process flow for encrypting a database according to aspects of the embodiment.

A process 400 of modifying an encryption scheme of a database system (e.g., the storage node 100 of FIG. 1) is shown in FIG. 4. In this example, a new master key is generated, with the same internal database keys being encrypted by the new master key.

At step 410, process 400 begins.

At step 420, read and write access to a node of a replica set is disabled. In one embodiment, the interface between the node and the outside environment is disabled, for example, by terminating the underlying network connection. In another embodiment, the application or process used to handle database read/write requests is terminated or otherwise disabled. In yet another embodiment, permissions for the database are changed so that read/write requests cannot be performed by anyone, or are limited to administrators. For example, an executable program (e.g., the database application 20) may be called from a command line with a command line parameter instructing the program to gracefully remove the node from operation by isolating it from read/write operations. The primary node and/or other nodes in the replica set may be notified of the node's unavailability.

At step 430, the first master key is optionally obtained. In one embodiment, the first master is obtained from the key management server using a suitable protocol or application programming interface and stored in a memory. In another embodiment, the first master key is obtained from a locally-stored keyfile that contains the master key in encrypted form. In one example, the first master key is the "current" master key that has been used for some period of time to encrypt and decrypt the internal database keys. The database application may request the master key from the key management server in a KMIP format. In another example, the database application may obtain the master key by making an API call on the key management server. For example, an executable program (e.g., the database application 20) may be called from a command line with a command line parameter instructing the program to obtain the first master key. In another embodiment, the first master key may already be resident in storage or elsewhere accessible to the database application, and need not be requested again.

At step 440, an internal database key, used to encrypt a database on the node of the replica set, is decrypted using the first master key. In particular, a decryption algorithm is applied to the encrypted internal database key (e.g., internal database key 40) using the first master key. For example, an executable program (e.g., the database application 20) may be called from a command line with a command line parameter instructing the program to decrypt the internal database key using the first master key. In some embodiments, particularly where there are multiple databases on the node, there may be multiple internal database keys as well, with each internal database key corresponding to a database, and vice versa. In that case, each of the multiple internal database keys is decrypted using the first master key.

At step 450, a second master key is obtained. In one embodiment, the second master key may be obtained through a local process for generating encryption keys. For example, an executable program (e.g., the database application 20) may be called from a command line with a command line parameter instructing the program to generate the second master key. The second master key may then be stored locally in a keyfile, or may be sent to a key management server for later retrieval and use.

In another embodiment, a request for the second master key may be sent to the key management server storing the second master key. The request may be sent using a suitable protocol or application programming interface, and the received second master key stored in a memory. For example, an executable program (e.g., the database application 20) may be called from a command line with a command line parameter requesting the master key from the key management server in a KMIP format. In another example, the database application may obtain the master key by making an API call on the key management server. If no second master key has yet been generated, a request may be sent to the key management server requesting that the second master key be generated and sent to the system. For example, an executable program (e.g., the database application 20) may be called from a command line with a command line parameter requesting that the key management server generate the second master key (if necessary) and transmit the second master key to the system. In one example, the executable program may be the database application which has been integrated with a key management appliance capable of securely communicating with the key management server.

In step 460, the internal database key is re-encrypted using the second master key. In particular, an encryption algorithm is applied to the internal database key (e.g., internal database key 40) using the second master key. For example, an executable program (e.g., the database application 20) may be called from a command line with a command line parameter instructing the program to encrypt the internal database key using the second master key. In some embodiments, particularly where there are multiple databases on the node, there may be multiple internal database keys as well, with each internal database key corresponding to a database, and vice versa. In that case, each of the multiple internal database keys is re-encrypted using the second master key.

At step 470, read and write access to the node of the replica set is restored. In one embodiment, the interface between the node and the outside environment is re-enabled, for example, by restoring the underlying network connection. In another embodiment, the application or process used to handle database read/write requests is re-started or otherwise re-enabled. In yet another embodiment, permissions for the database are changed so that read/write requests can be performed according to normal operating conditions. For example, an executable program (e.g., the database application 20) may be called from a command line with a command line parameter instructing the program to restore the node to normal operation.

In step 480, steps 420 through 470 are repeated for one or more additional nodes, one-by-one, until all of the nodes in the replica set have had their internal database keys encrypted using the new master key. In one embodiment, all of the secondary nodes in the replica set are processed one-by-one, followed lastly by the primary node. In one example, a secondary node that has successfully undergone a master key change by steps 420 through 470 may be designated as the primary node, and the then-current primary node redesignated as a secondary node. In this way, it can be ensured that a primary node with internal database keys encrypted by the current master key is always available, even when the then-current primary node is to be taken offline to undergo the master key change.

Process 400 ends at step 490.

Figure 5:
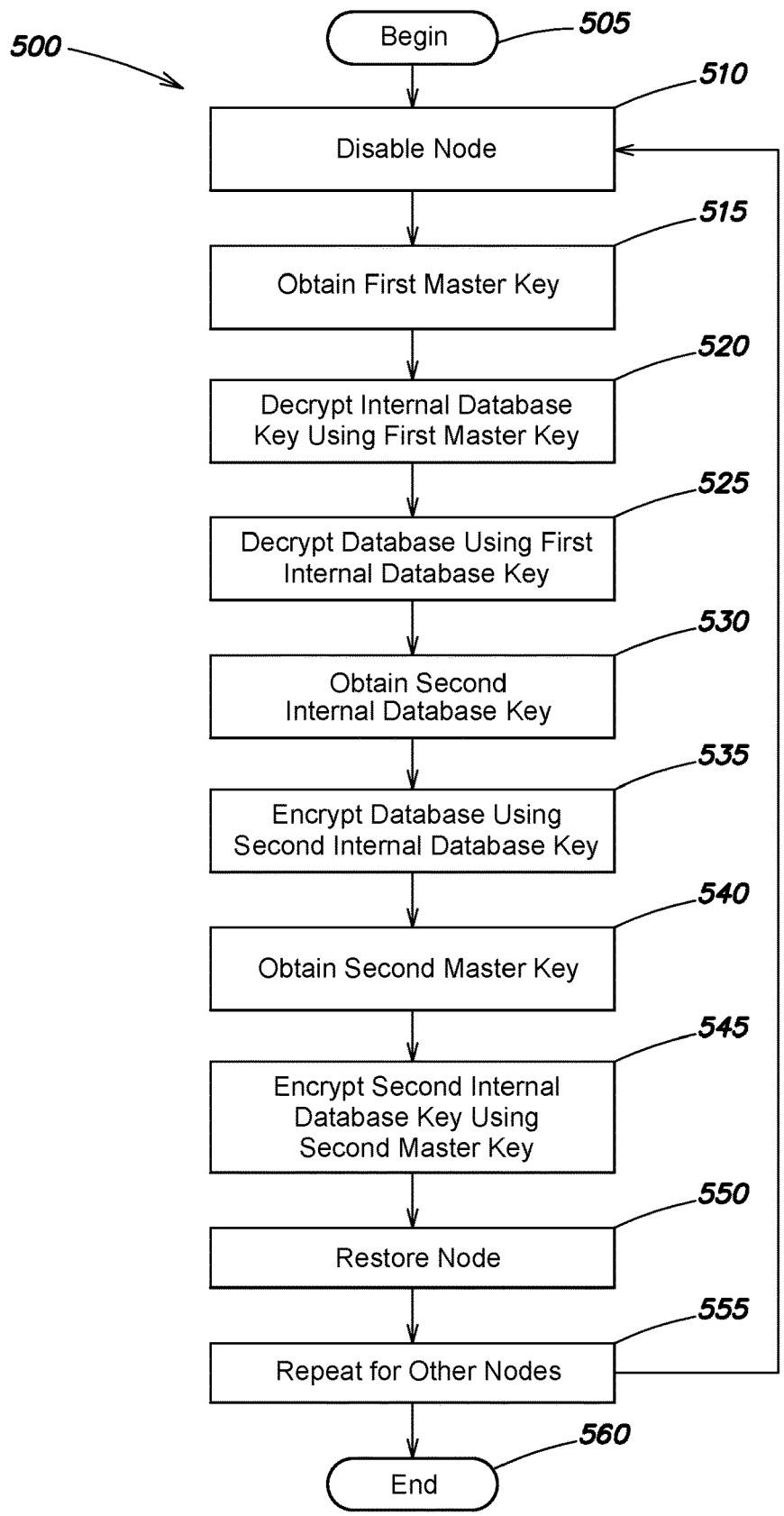
FIG. 5 illustrates another example process flow for encrypting a database according to aspects of the embodiment.

Another process 500 of modifying an encryption scheme of a database system (e.g., the storage node 200 of FIG. 2) is shown in FIG. 5. In this example, both a new master key and new internal database key(s) are generated and/or obtained. The database is encrypted using the new internal database key, and the new internal database keys in turn are encrypted by the new master key.

At step 505, process 500 begins.

At step 510, read and write access to a node of a replica set is disabled. In one embodiment, the interface between the node and the outside environment is disabled, for example, by terminating the underlying network connection. In another embodiment, the application or process used to handle database read/write requests is terminated or otherwise disabled. In yet another embodiment, permissions for the database are changed so that read/write requests cannot be performed by anyone, or are limited to administrators. For example, an executable program (e.g., the database application 20) may be called from a command line with a command line parameter instructing the program to gracefully remove the node from operation by isolating it from read/write operations.

At step 515, the first master key is optionally obtained. In one embodiment, the first master key is obtained from a locally-stored keyfile that contains the master key in encrypted form. In another embodiment, the first master is obtained from the key management server using a suitable protocol or application programming interface and stored in a memory. In one example, the first master key is the "current" master key that has been used for some period of time to encrypt and decrypt the internal database keys.

At step 520, a first internal database key, used to encrypt a database on the node of the replica set, is decrypted using the first master key. In particular, a decryption algorithm is applied to the first encrypted internal database key (e.g., internal database key 40) using the first master key. For example, an executable program (e.g., the database application 20) may be called from a command line with a command line parameter instructing the program to decrypt the internal database key using the first master key. In some embodiments, particularly where there are multiple databases on the node, there may be multiple internal database keys as well, with each internal database key corresponding to a database, and vice versa. In that case, each of the multiple internal database keys is decrypted using the first master key.

At step 525, the database is decrypted using the first internal database key. In particular, a decryption algorithm is applied to the database (e.g., database 10) using the first internal database key. For example, an executable program (e.g., the database application 20) may be called from a command line with a command line parameter instructing the program to decrypt the database using the internal database key. In embodiments where there are multiple databases on the node, there may be multiple internal database keys as well, with each internal database key corresponding to a database, and vice versa. In that case, each database is decrypted using one of the multiple internal database keys.

At step 530, a second internal database key is generated. In one embodiment, the second master key may be generated through a local process for generating encryption keys. For example, an executable program (e.g., the database application 20) may be called from a command line with a command line parameter instructing the program to generate the second master key. In embodiments where there are multiple databases on the node, a second internal database key is generated for each database on the node.

In step 535, the database is re-encrypted using the second internal database key. In particular, all of the data in the database (e.g., database 10) may be rewritten (e.g., by the storage engine 30) to another copy of the database, with an encryption algorithm being applied to the database using the second internal database key. For example, an executable program (e.g., the database application 20) may be called from a command line with a command line parameter instructing the program to encrypt the database using the second internal database key. In embodiments where there are multiple databases on the node, each database is re-encrypted using one of the second internal database keys generated in step 530.

At step 540, a second master key is obtained. In one embodiment, the second master key may be obtained through a local process for generating encryption keys. For example, an executable program (e.g., the database application 20) may be called from a command line with a command line parameter instructing the program to generate the second master key. The second master key may then be stored locally in a keyfile, or may be sent to a key management server for later retrieval and use.

In step 545, the second internal database key is re-encrypted using the second master key. In particular, an encryption algorithm is applied to the second internal database key (e.g., internal database key 40) using the second master key. For example, an executable program (e.g., the database application 20) may be called from a command line with a command line parameter instructing the program to encrypt the second internal database key using the second master key. In some embodiments, particularly where there are multiple databases on the node, there may be multiple second internal database keys as well, with each internal database key corresponding to a database, and vice versa. In that case, each of the multiple second internal database keys is re-encrypted using the second master key.

At step 550, read and write access to the node of the replica set is restored. In one embodiment, the interface between the node and the outside environment is re-enabled, for example, by restoring the underlying network connection. In another embodiment, the application or process used to handle database read/write requests is re-started or otherwise re-enabled. In yet another embodiment, permissions for the database are changed so that read/write requests can be performed according to normal operating conditions. For example, an executable program (e.g., the database application 20) may be called from a command line with a command line parameter instructing the program to restore the node to normal operation.

Steps 510 through 550 describe the process for disabling a node of the replica set, encrypting the internal database keys for that node with a new master key, and re-enabling the node. In step 555, steps 510 through 550 are repeated for one or more additional nodes, one-by-one, until all of the nodes in the replica set have had their internal database keys encrypted using the new master key. In one embodiment, all of the secondary nodes in the replica set are processed one-by-one, followed lastly by the primary node. In one example, a secondary node that has successfully undergone a master key change by steps 510 through 550 may be designated as the primary node, and the then-current primary node redesignated as a secondary node. In this way, it can be ensured that a primary node with internal database keys encrypted by the current master key is always available, even when the then-current primary node is to be taken offline to undergo the master key change.

Process 500 ends at step 560.

The various processes described herein can be configured to be executed on the systems shown by way of example in FIGS. 1-5. The systems and/or system components shown can be programmed to execute the processes and/or functions described.

Additionally, other computer systems can be configured to perform the operations and/or functions described herein. For example, various embodiments according to the present invention may be implemented on one or more computer systems. These computer systems may be, specially configured, computers such as those based on Intel Atom, Core, or PENTIUM-type processor, IBM PowerPC, AMD Athlon or Opteron, Sun UltraSPARC, or any other type of processor. Additionally, any system may be located on a single computer or may be distributed among a plurality of computers attached by a communications network.

A special-purpose computer system can be specially configured as disclosed herein. According to one embodiment of the invention the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers.

Figure 6:
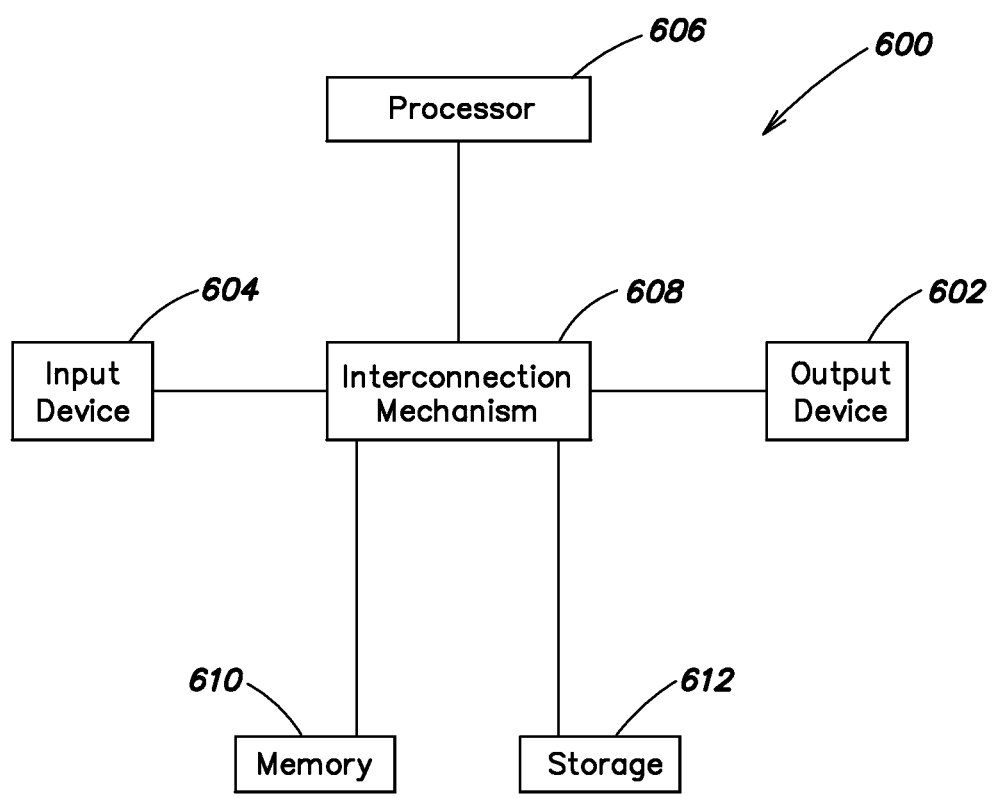
FIG. 6 is a block diagram of an example distributed database system in which various aspects of the present invention can be practiced.

FIG. 6 shows a block diagram of an example special-purpose computer system 600 on which various aspects of the present invention can be practiced. For example, computer system 600 may include a processor 606 connected to one or more memory devices 610, such as a disk drive, memory, or other device for storing data. Memory 610 is typically used for storing programs and data during operation of the computer system 600. Components of computer system 600 can be coupled by an interconnection mechanism 608, which may include one or more busses (e.g., between components that are integrated within a same machine) and/or a network (e.g., between components that reside on separate discrete machines). The interconnection mechanism enables communications (e.g., data, instructions) to be exchanged between system components of system 600.

Computer system 600 may also include one or more input/output (I/O) devices 602-604, for example, a keyboard, mouse, trackball, microphone, touch screen, a printing device, display screen, speaker, etc. Storage 612, typically includes a computer readable and writeable nonvolatile recording medium in which computer executable instructions are stored that define a program to be executed by the processor or information stored on or in the medium to be processed by the program.

Figure 7:
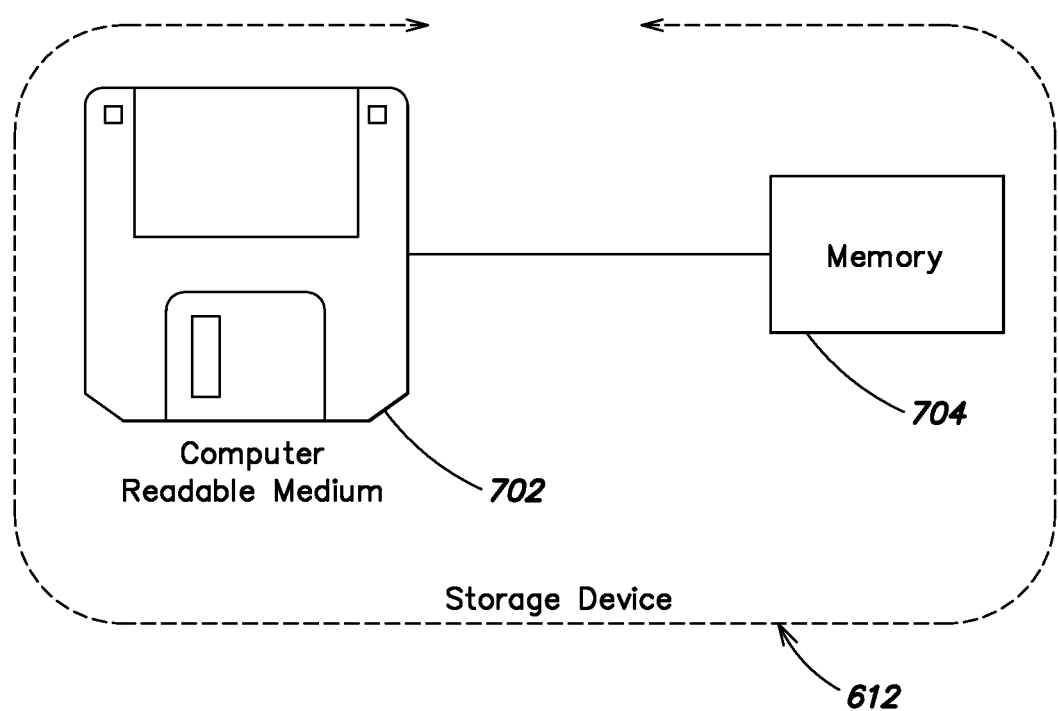
FIG. 7 is a block diagram of an example distributed database system in which various aspects of the present invention can be practiced.

The medium can, for example, be a disk 702 or flash memory as shown in FIG. 7. Typically, in operation, the processor causes data to be read from the nonvolatile recording medium into another memory 704 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 6, the memory can be located in storage 612 as shown, or in memory system 610. The processor 606 generally manipulates the data within the memory 610, and then copies the data to the medium associated with storage 612 after processing is completed. A variety of mechanisms are known for managing data movement between the medium and integrated circuit memory element and the invention is not limited thereto. The invention is not limited to a particular memory system or storage system.

Figure 8:
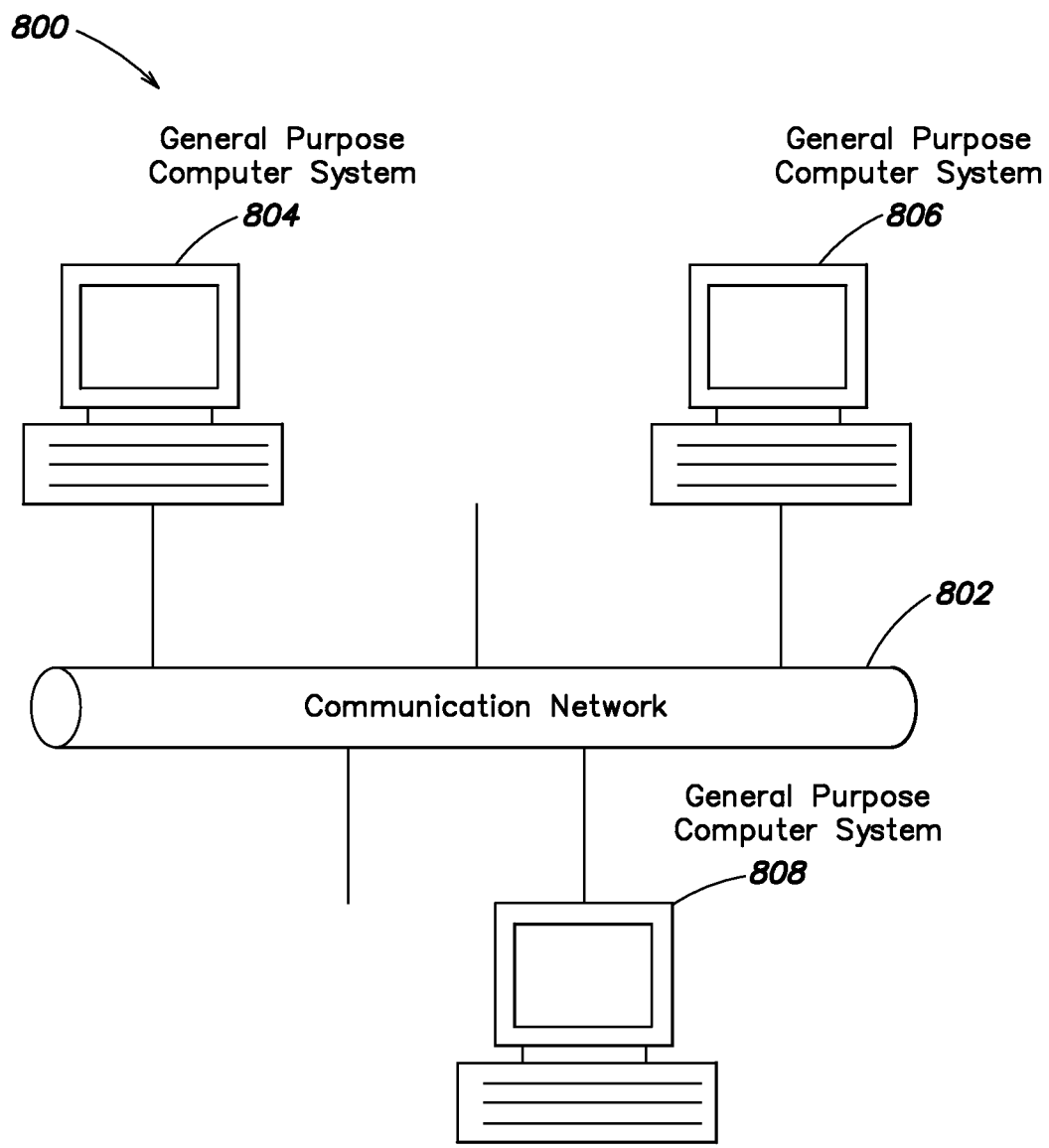
FIG. 8 is a block diagram of an example distributed database system in which various aspects of the present invention can be practiced.

The computer system may include specially-programmed, special-purpose hardware, for example, an application-specific integrated circuit (ASIC). Aspects of the invention can be implemented in software, hardware or firmware, or any combination thereof. Although computer system 600 is shown by way of example, as one type of computer system upon which various aspects of the invention can be practiced, it should be appreciated that aspects of the invention are not limited to being implemented on the computer system as shown in FIG. 8. Various aspects of the invention can be practiced on one or more computers having a different architectures or components than that shown in FIG. 6.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C # (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 800 shown in FIG. 8. For instance, the system can be a distributed system (e.g., client server, multi-tier system) that includes multiple special-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, etc. These systems can also permit client systems to request database operations transparently, with various routing processes handling and processing requests for data as a single interface, where the routing processes can manage data retrieval from database partitions, merge responses, and return results as appropriate to the client, among other operations.

There can be other computer systems that perform functions such as hosting replicas of database data, with each server hosting database partitions implemented as a replica set, among other functions. These systems can be distributed among a communication system such as the Internet. One such distributed network, as discussed below with respect to FIG. 8, can be used to implement various aspects of the invention. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring two phase commit operations for updates.

FIG. 8 shows an architecture diagram of an example distributed system 800 suitable for implementing various aspects of the invention. It should be appreciated that FIG. 8 is used for illustration purposes only, and that other architectures can be used to facilitate one or more aspects of the invention.

System 800 may include one or more specially configured special-purpose computer systems 804, 806, and 808 distributed among a network 802 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for modifying an encryption scheme of a database system, comprising acts of:
    selecting a first secondary node of a replica set, the replica set comprising at least a primary node and a plurality of secondary nodes, and disabling read and write access to at least one database instance hosted on the first secondary node of the replica set;
    decrypting an internal database key using a first master key for the at least one database instance on the node of a replica set;
    obtaining a second master key via a key management interface;
    for the at least one database on the first secondary node of the replica set, encrypting the internal database key using the second master key;
    restoring read and write access to the first secondary node of the replica set;
    triggering key rotation for the other nodes of the replica set responsive to validating proper encryption of a prior node of the replica set; and
    wherein the act of triggering key rotation for the other nodes of the replica set includes executing key rotation on at least one secondary node of the replica set prior to executing key rotation on a respective primary node.

2. The method of claim 1, further comprising an act of limiting key rotation operations to a node and an associated database within a respective replica set.

3. The method of claim 1, wherein responsive to validating proper execution of key rotation on the secondary nodes of the replica set, triggering key rotation on the primary node.

4. The method of claim 3, wherein triggering key rotation on the at least one primary node includes:
    demoting the primary node to a secondary node:
    automatically electing a new primary from the secondary nodes on which key rotation has been executed; and
    disabling read write access to the demoted primary node.

5. The method of claim 1, further comprising an act of automatically obtaining the second master key from a key management server.

6. The method of claim 5, wherein the act of automatically obtaining the second master key includes receiving the second master key via a key management interoperability protocol (KMIP) or via an Application Programming Interface (API), in communication with the key management server external to the database system.

7. The method of claim 1, further comprising an act of automatically determining a key rotation operation should be executed.

8. The method of claim 1, wherein the act of obtaining a second master key via a key management interface includes an act of obtaining at least one new internal key for the at least one database instance; and wherein the act of encrypting the internal database key using the second master key is executed responsive to validating an act of re-encrypting the at least one database instance with the new at least one internal key.

9. The method of claim 8, further comprising an act of generating a duplicate secondary node responsive scheduling an internal key rotation operation.

10. The method of claim 9, further comprising an act of executing key rotation on the duplicate secondary node.

11. A system for modifying an encryption scheme of a database system, the system comprising:
at least one processor operatively connected to a memory, the at least one processor when executing configured to:
select a first secondary node of a replica set, the replica set comprising at least a primary node and a plurality of secondary nodes, and disable read and write access to at least one database instance hosted on the first secondary node of the replica set;
decrypt an internal database key using a first master key for the at least one database instance on the node of a replica set;
obtain a second master key via a key management interface;
for the at least one database on the first secondary node of the replica set,
encrypt the internal database key using the second master key;
restore read and write access to the first secondary node of the replica set; and
trigger key rotation for the other nodes of the replica set responsive to validating proper encryption of a prior node of the replica set,
wherein the act of triggering key rotation for the other nodes of the replica set includes executing key rotation on at least one secondary node of the replica set prior to executing key rotation on a respective primary node.

12. The system of claim 11, wherein the at least one processor is configured to limit key rotation operations to a node and an associated database within a respective replica set.

13. The system of claim 12, wherein the at least one processor is configured to trigger key rotation on the primary node responsive to validation of proper execution of key rotation on the secondary nodes of the replica set.

14. The system of claim 13, wherein the operation to trigger key rotation on the primary node includes operations to:
demote the primary node to a secondary node:
automatically elect a new primary from the secondary nodes on which key rotation has been executed; and
disable read write access to the demoted primary node.

15. The system of claim 11, wherein the at least one processor is configured to automatically obtain the second master key from a key management server.

16. The system of claim 15, wherein the operation to automatically obtain the second master key includes operations to receive the second master key via a key management interoperability protocol (KMIP) or via an Application Programming Interface (API), in communication with the key management server external to the database system.

17. The system of claim 11, wherein the at least one processor is configured to automatically determine a key rotation operation should be executed.

18. The system of claim 11, wherein the at least one processor is configured to obtain a second master key via a key management interface which includes an operation to obtain at least one new internal key for the at least one database instance; and
wherein the operation to encrypt the internal database key using the second master key is executed responsive to validating an act of re-encrypting the at least one database instance with the at least one new internal key.

19. The system of claim 18, wherein the at least one processor is configured to generate a duplicate secondary node responsive scheduling an internal key rotation operation.

20. The method of claim 19, wherein the at least one processor is configured execute key rotation on the duplicate secondary node.

* * * * *